United States Patent [19]

Kawada

[11] 3,921,749
[45] Nov. 25, 1975

[54] ANTI-CRASH RADIO-DETECTOR SYSTEM FOR AUTOMOTIVE VEHICLE

[75] Inventor: Shoji Kawada, Toyota, Japan

[73] Assignee: Aisin Seiki Kabushiki Kaisha, Kariya, Japan

[22] Filed: Oct. 22, 1974

[21] Appl. No.: 516,906

[30] Foreign Application Priority Data
Oct. 24, 1973 Japan............................ 48-120246
Oct. 24, 1973 Japan............................ 48-120247
Oct. 24, 1973 Japan............................ 48-120248

[52] U.S. Cl................... 180/98; 340/32; 340/53 R; 343/7 VM; 180/106
[51] Int. Cl.²............................................ B60T 7/16
[58] Field of Search........ 180/98, 105 R, 105 E, 99, 180/106; 343/7 ED, 7 VM; 340/32, 33, 53 R

[56] References Cited
UNITED STATES PATENTS

| | | | |
|---|---|---|---|
| 2,841,782 | 7/1958 | McIwain | 180/98 X |
| 2,991,839 | 7/1961 | DeRemer | 180/99 |
| 2,996,137 | 8/1961 | Chu et al. | 180/98 |
| 3,448,822 | 6/1969 | LaLone et al. | 340/33 X |
| 3,725,921 | 4/1973 | Weidman et al. | 343/7 VM |

*Primary Examiner*—Kenneth H. Betts
*Attorney, Agent, or Firm*—James E. Mrose

[57] ABSTRACT

Anti-crash radio-detector system for automotive vehicles adapted to take due consideration of all traffic conditions and operate efficiently for preventing an accident when an obstacle is detected ahead.

The system is characterized in that it comprises a radio electric or radar detector, a device for producing an information concerning the actual speed of the vehicle, an electric computer for determining a brake controlling signal and acceleration controlling signal on the basis of informations relating approaching speed to the obstacle, distance between the vehicle and the obstacle, and the information concerning the actual speed of the vehicle, and release or blocking circuit to block communication between the computer and both of the brake actuating mechanism and the throttle valve actuating mechanism.

4 Claims, 25 Drawing Figures

$e_0 = \dfrac{R_o}{R_i}(e_2 - e_1)$

FIG. 13c $e_0 = -R_o C \dfrac{de_1}{dt}$

FIG. 14

ANTI-CRASH RADIO-DETECTOR SYSTEM FOR AUTOMOTIVE VEHICLE

BACKGROUND OF THE INVENTION

The present invention relates to radio detectors and more particularly to an anti-crash radio detector for automotive vehicles.

It has heretofore been presented various devices adapted to forestall the presence of a fixed or movable obstacle on the trajectory of a vehicle, at a predetermined distance ahead thereof, and to warn accordingly the driver of the vehicle of the likelihood of a danger.

SUMMARY OF THE INVENTION

Now the present invention relates more particularly to a radio detector of this character which is capable of taking due consideration of all momentary traffic condition and to exert an efficient control action for preventing an accident when an obstacle is detected ahead.

For this purpose, the anti-crash radio detector for automotive vehicles according to this invention is characterized essentially in that it comprises a radio-electric or radar detector directing ahead of the vehicle radio-electric or Hertzian waves forming a beam of predetermined length and receiving the echoes produced by fixed or movable obstacles appearing ahead of the vehicle and producing from the information supplied by the echoes other informations related to the velocity of approach of the equipped vehicle with respect to a fixed or movable obstacle and a distance between the vehicle and the obstacle, a device for producing actual speed signal from the rotational speed of the wheels of the vehicle, a computer for determining as a function of the approaching speed, the said distance between the vehicle and the obstacle and the actual speed of the vehicle a brake controlling signal and an acceleration controlling signal, means for blocking operative connection between the computer and either of the brake actuator and the throttle valve mechanism in case of operation of either of the steering wheel through a predetermind angle or the ordinary turn direction indicator by the driver, means to limit the brake controlling signal to a reference rate when the vehicle actual speed is higher than a calibrated value to which the reference rate is proportional at all times, an alarming device for alarming to have the driver become aware of whether or not the brake controlling signal is under the limitation of the said latter means, means for determining on the basis of the momentary actual speed signal, said acceleration controlling signal and an information corresponding to the maxmum of the said acceleration controlling signal a time constant to properly delay acceleration of the vehicle while permitting rapid deceleration, and means to record in the latter means an information corresponding to the said maxmum of the acceleration controlling signal.

With the radio-detector system according to this invention any possibility of crash between the vehicle equipped therewith and a fixed or movable obstacle present on or cutting in its path is safely avoided, while preventing useless brake controlling and throttle valve controlling caused by any obstacles ahead of the vehicle but not in its actual path. The system is enabled to prevent any excessive or sudden braking force as would otherwise defeat the normal or proper steering by limiting the brake controlling signal to a predetermined rate which is proportional to said actual speed of the vehicle at all times. The driver is enabled to become aware of insufficiency of the braking force by the alarming device to thereby avoid likelihood of crash. The system is still enabled to properly delay the acceleration of the vehicle while permitting rapid deceleration so that any danger is avoided and smooth travelling is achieved.

DETAILED DESCRIPTION OF THE PREFERRED EMBODIMENT

Figure 1:
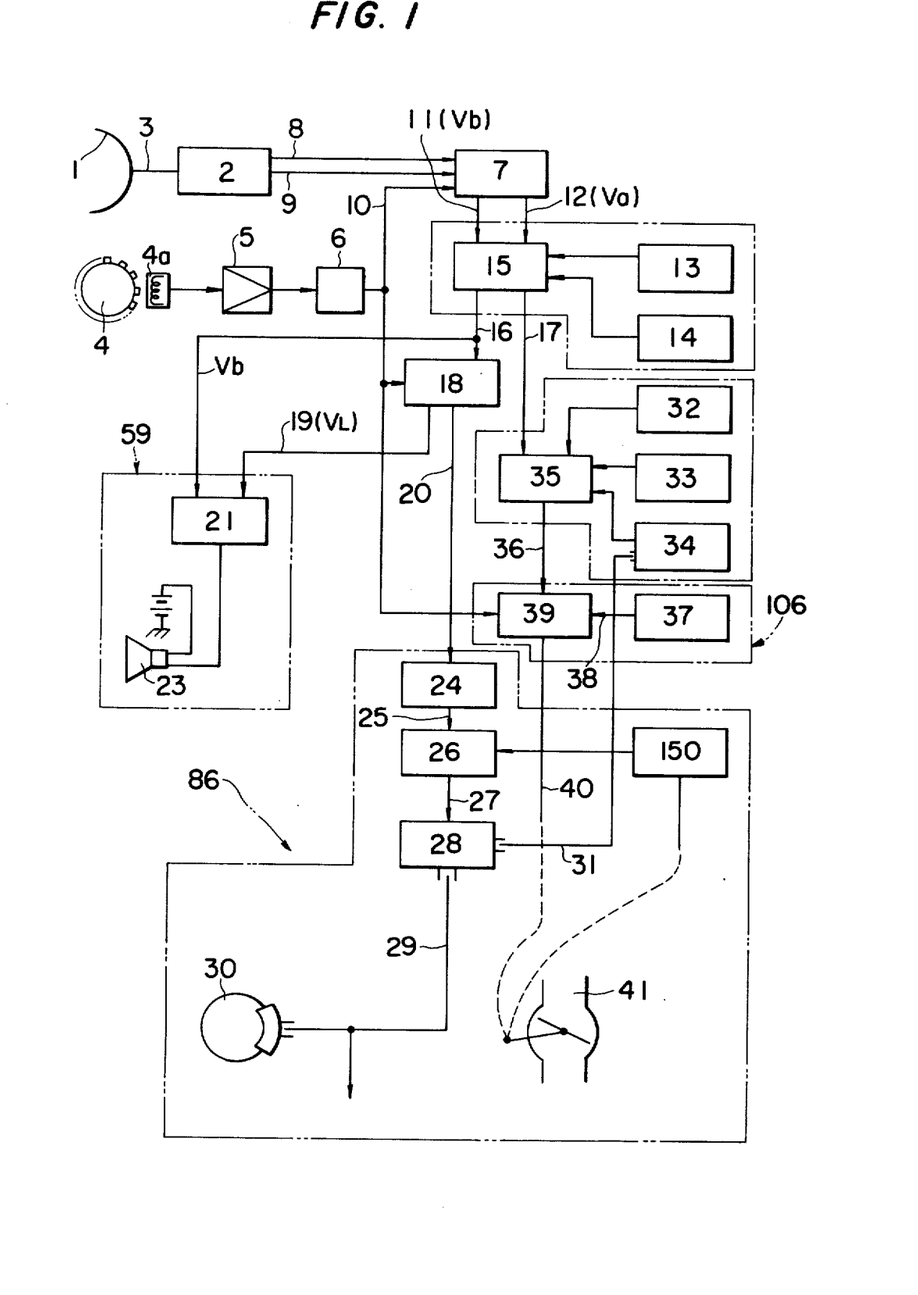
FIG. 1 is a block diagram of an embodiment of the invention.

Anti-crash radio-detector system illustrated diagrammatically in block form in FIG. 1 is mounted on an automotive vehicle and comprises at the front thereof a miniature radioelectric or radar detector of the type utilizing a microwave generator or any other hertzian wave apparatus operating on suitable wavelengths or frequencies.

This miniature radar or detector 2 is adapted to transmit ahead of the vehicle a microwave or similar wave beam from its parabola antenna 1 having a bearing corresponding to distance. The parabola antenna 1 receives the echoes caused by the reflection of the beam by fixed or movable obstacles appearing ahead of the vehicle. The radar 2 produces from the echoes other informations related to the velocity of approach of the equipped vehicle with respect to a fixed or movable obstacle, and related to the distance between the equipped vehicle and the fixed or movable obstacle as at its outputs 9 and 8 respectively. The computer 7 receives further input 10 from a frequency-voltage converter 6. The frequency-voltage converter 6 is referred to hereinafter as merely "P-V converter". The P-V converter 6 has its input connected to the output of an amplifier 5 and the amplifier 5 has its input connected to the output of a tachometric pickup 4a of a tachometer or sensor 4 which generates at its output an actual speed signal of the vehicle.

The computer 7 will determine on the basis of these input data supplied through the outputs 8 and 9 a brake controlling signal $Vb$ at its output 11 and an acceleration controlling signal $Va$ at the other output 12 at all times.

A switch circuit or release circuit 15 has its inputs connected to the outputs 11 and 12 of the computer 7 and also receives two inputs from a steering wheel 14 and a turn direction indicator mechanism 13 to thereby block communication between the inputs 11 and an output 16 as well as between input 12 and an output 17, as will be explained presently. The computer 7 transmits at its outputs 11 signal V$b$ corresponding to the braking force to be applied and at the output 12 signal V$a$ corresponding to an acceleration required at any time.

The above two signals V$b$ and V$a$ are fed to a brake actuator 30 and a throttle valve mechanism 41 respectively to thereby take due consideration of all momentary traffic conditions and to exert an efficient control action for preventing an accident when an obstacle is detected ahead. The output 16 corresponds to the brake controlling signal V$b$ and is fed to a control circuit 18. The circuit 18 is further supplied the input 10 on which appears the actual speed potential V$e$ from the frequency-voltage converter 6. The circuit 18 limits on the basis of these two input data the brake controlling signal V$b$ to a reference value VL which will be explained presently. The output 20 on which appears the brake controlling signal V$b$ is fed to a voltage-ampere converter 24. The output 25 of the converter 24 is fed via ON-Off circuit 26 to the actuator 28 of the brake 30. The circuit 28 receives signals from an acceleration pedal mechanism 150 to disconnect the circuit 26 from the output 25. The brake actuator 28 is prevented from controlling action in case of acceleration of the vehicle.

An alarm device 21 receives the signal V$b$ on output 16 of the circuit 15 and the signal VL on output 19 of the control circuit 18. As aforementioned, the signal VL represents the reference value to which the brake controlling signal V$b$ is limited when the V$b$ is above the value. On the basis of these input data the alarm device 21 determines two types of alarming sound. One of these alarming sound signals is a series of multiple short sounds and the other is a continuous long sound. Difference between the two signals will be explained presently.

The computer determines on the basis of the input data 8 and 9 an acceleration signal V$a$ at the output 12 calculated at all times. The output 12 on which appears signal V$a$ is permitted to pass through circuit 15. The output 17 of the circuit 15 introduces the acceleration control signal V$a$ into the set-reset circuit 35. The circuit 35 serves to interconnect the input 17 and its output 36 by a manual operation and continues that connection until any one of the clutch pedal and the brake pedal is depressed. The circuit 35 has its output 36 connected to the input of a speed controlling circuit 39.

The circuit 39 has its input 38 connected to a reference speed circuit 37 and the other input connected to the output 10 on which appears the actual speed signal V$e$. The circuit 39 serves as a delay-action device in order to eliminate sudden acceleration of the vehicle while permits deceleration rapidly. The circuit 35 also limits the acceleration to the input from the circuit 37 on which appears the reference speed signal V$d$ which will be explained presently.

The output 40 of the circuit 39 is fed to the throttle valve mechanism 41 to put it in operative position.

Keeping the aforementioned general knowledge of the present invention, in mind, the various parts of the system of the present invention will be described in detail hereinafter.

Figure 2:
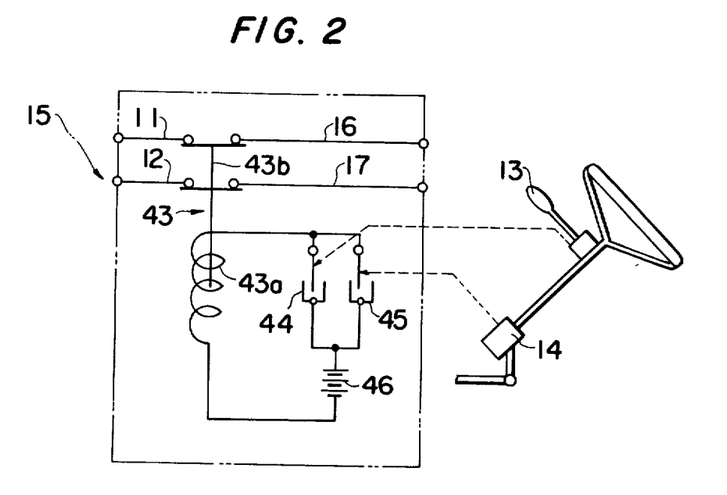
FIG. 2 is a partial schematic which embodies the invention for equipping an automotive vehicle.

Now referring to FIG. 2, the circuit 15 is described in detail. The inputs 11 and 12 are normally connected to the outputs 16 and 17 respectively through a relay switch 43$b$ which is operatively connected to a relay coil 43. The relay coil 43$a$, electric source 46 and a pair of switches 44 and 45 are connected to each other to form an electric circuit as shown by the solid line in the view. The switch 44 is operatively connected to the manually operable turn direction indicator lever 13 and the switch 45 is operatively connected to the steering mechanism 14. Any movement of the lever 13 will eliminate the brake controlling and acceleration controlling as a consequence of energization of coil 43$a$ to open the switch 43$b$. The same elimination will take place by a rotation of the steering wheel through an angle of predetermined calibrated value in any direction. If the curve ahead of the vehicle requires a steering angle of less value than that angle the system will operate as in the case of straight roads or paths.

Figure 3:
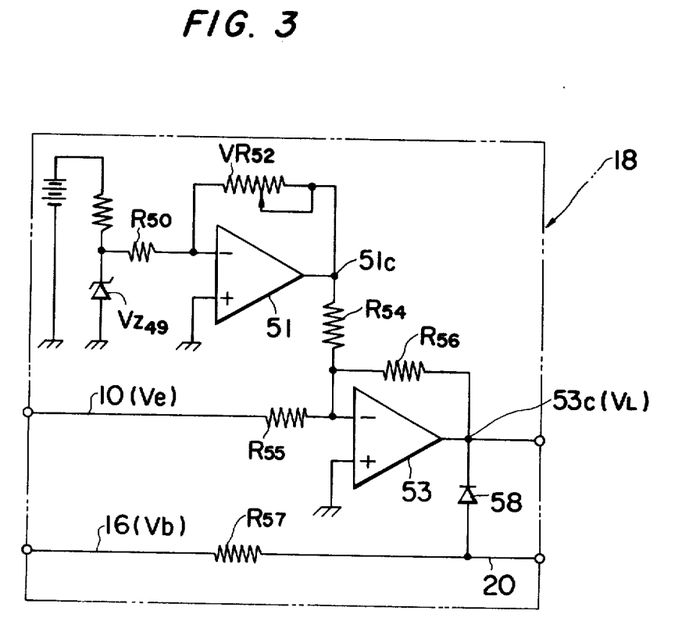
FIGS. 3 and 4 are partial schematics which embody the invention.
Figure 8:
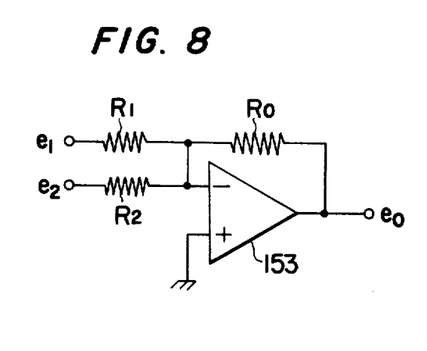
FIG. 8 is a partial schematic upon which is based the circuit of FIG. 3.

The controlling circuit 18 is described in detail in FIG. 3. The basic operational amplifiers 51 and 53 of the circuit 18 are known and conventional as illustrated in FIG. 8. In FIG. 8, the operational amplifier 153, which will be referred to as "OP amplifier" hereinafter, is of such nature that input impedance is infinite while output impedance is zero and voltage amplifying capacity is infinite. The output may be determined by the well-known following formula:

$$e_o = -\left( \frac{Ro}{R1} e_1 + \frac{Ro}{R2} e_2 \right)$$

In FIG. 3, the signal V$e$ on the output 10 varying as a function of the momentary actual speed of the vehicle is fed through resistor R55 to the inverting input terminal of the OP amplifier 53 while the non-inverting input terminal thereof leads to ground. The brake control signal V$b$ corresponding to a momentary braking force to be applied is fed through a diode 58 and a resistor R57 to an output 53$c$ of the amplifier 53. The OP amplifier 51 has its output 51C connected in feedback relation through a manually variable resistor VR52 to its inverting input terminal. It will be noted that by varying the value of the resistor VR52, a potential exhibited on the output 51C may be varied. The output 51C is connected through a resistor R54 to the inverting input of the OP amplifier 53 together with the actual speed signal V$e$. It will be noted from the foregoing that the output 51C is determined by the formula:

$$51C = - \frac{VR52}{R50} VZ49$$

where VZ49 is a potential applied through a resistor R50 to the inverting input of the OP amplifier 51.

From the preceding, it will be understand that the output 53C of the OP amplifier 53 is determined by the formula:

$$\frac{R56}{R54} \cdot \frac{R52}{R50} \cdot VZ49 - \frac{R56}{R55} Ve$$

The above output 53C is hereinafter referred to as the brake limiting signal VL.

Figure 9:
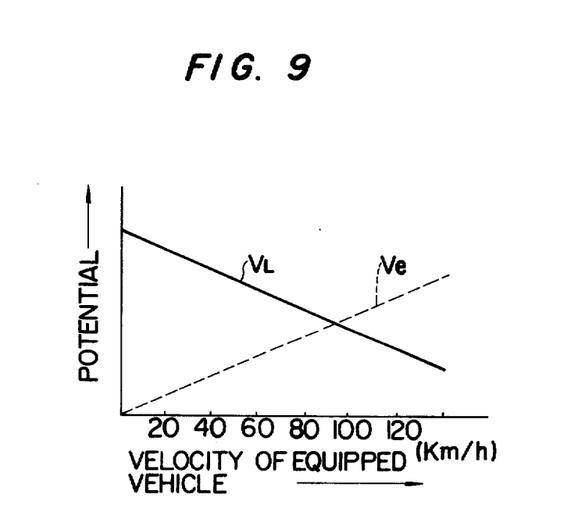
FIGS. 9 and 10 are graphical illustrations of the performance of the circuit of FIG. 3.
Figure 10:
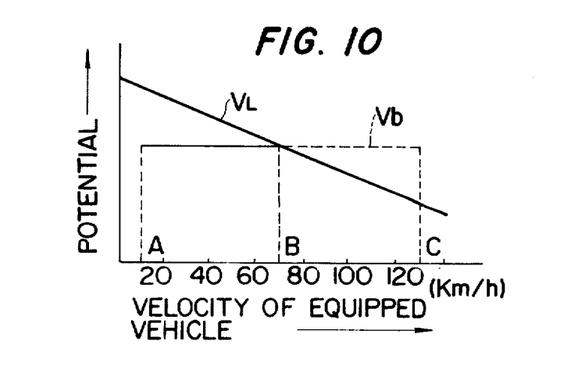

In FIGS. 9 and 10, a graphical illustration of the brake limiting signal VL and the signal Ve corresponding to the actual speed of the equipped vehicle are shown. As will be seen in FIG. 9, the signal VL decreases as the speed of the vehicle increases, whereas signal Ve increases as the speed of the vehicle increases. Proper choice of the resistor R57 at a small value causes the potential drop across the resistor R57 to be limited to a very small one. Hence, potential appearing at the output 20 will be considered as being potential Vb. However, if the potential Vb exceeds the potential VL appearing at output 53C, the current will flow through diode 58 to the junction 53C. Since the value of the resistor 58 is a smaller one so that the potential drop across the resistor R57 renders the potential at the output 53C nearly identical one with that of VL. This is illustrated in FIG. 10. As shown in FIG. 10, between points A and B, the potential Vb is lower than the potential VL so that current will flow with a negligible potential drop through resistor R57 to the output 20, whereas between points B and C, the potential Vb is higher than VL so that current will flow across the diode 58 to decay along curve of the potential VL at the output 53C. The horizontal solid line in FIG. 10 represents the brake controlling signal Vb which coincides with the line VL between points B and C.

From the prededing, it will be understand that the signal Vb appears exactly at output 20 during the time the line Vb is below the line VL whereas the potential Vb does not appear at output 20 during the time Vb line is above line VL.

In other words, the brake controlling potential Vb never appears at output 20 with a higher potential than the potential VL. The potential VL is lowered in proportion to the actual speed of the equipped vehicle as shown in FIG. 9. Accordingly, the brake controlling reference potential to which the brake the potential Vb is limited varys in proportion to the momentary actual speed of the vehicle so that dangerous excessive braking force is not applied. It should be noted that the potential Vb is proportional to the braking force to be applied but is limited to decay along the VL decay during the time Vb is in excess of VL.

Figure 4:
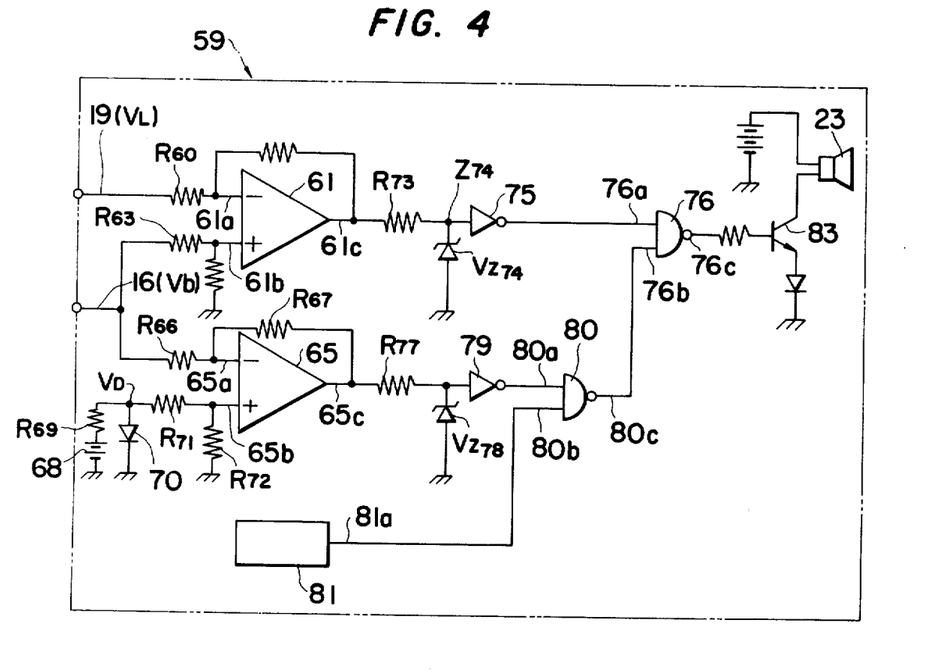
Figure 11:
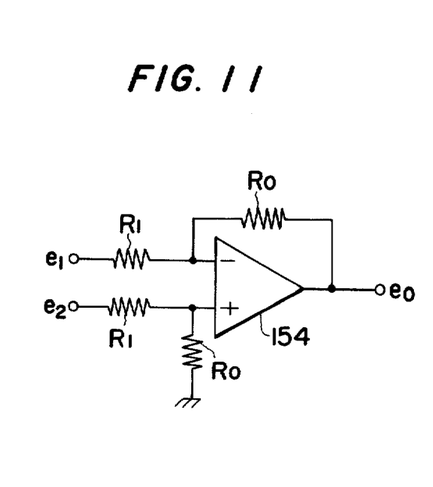
FIG. 11 is a partial schematic upon which is based the circuit of FIG. 4.

Referring to FIG. 4, the alarm device 21 enclosed by the dash line 59 in FIG. 1 is described. To the inputs 19 and 16, the signals VL and Vb are supplied respectively. The device is based upon the known circuit as shown in FIG. 11. In FIG. 11, the OP amplifier 154 is of such character that input impedance is infinite and output impedance is negligible while the rate of amplifying is infinite. In the circuit of FIG. 11, the input potentials $e_1$ and $e_2$ are supplied across the same resistor R1 to the inverting input and non-inverting input respectively. The output $e_o$ is connected in feedback relation through a resistor Ro to the inverting input while the non-inverting input is connected to ground through a resistor Ro. The resulting output potential $e_o$ is the following conventional one.

$$e_o = \frac{Ro}{R1}(e_2 - e_1)$$

In FIG. 4, the brake controlling signal Vb at the input 16 is supplied through resistor 66 to the inverting input 65a of the OP amplifier 65. A power supply circuit is formed of a power source 68, resistor R69, and diode 70. Current will flow through this circuit and a potential VD exhibited on the anode lead of the diode 70 may be limited to a very smaller one by employing the known germanium diode. The potential VD is supplied through a resistor R71 to the non-inverting input of the OP amplifier 65. Asuming, R66 = R71 = Ri; and
R67 = R72 = Ro;

the output potential V65 at output 65C of the OP amplifier 65 will be determined by the known formula $$V65 = \frac{Ro}{Ri}(VD - Vb)$$

Proper choice of Ro/Ri at a very large value, the OP amplifier 65 may serve as a comparator. During the time the signal VD is higher than signal Vb, the OP amplifier 65 is driven to saturate with the output potential at about positive potential of the power source 68 while during the time the signal VD is above signal Vb, the OP amplifier 65 is driven to saturate with the output potential at about negative potential of the electric power source 68. The output potential at output 65C of the OP amplifier 65 is supplied through a resistor R77 and is subjected to an action of a zener diode VZ78. As a result there are imposed on the current various wave potentials on the corresponding parts of the circuit as shown in FIG. 12.

Figure 12A:
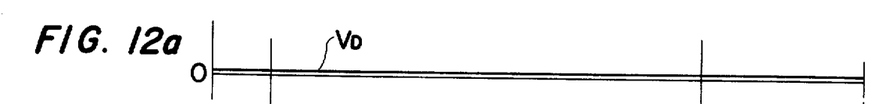
FIGS. 12a to 12j are graphical illustrations of various potentials appearing at corresponding parts of the circuit of FIG. 4.
Figure 12B:
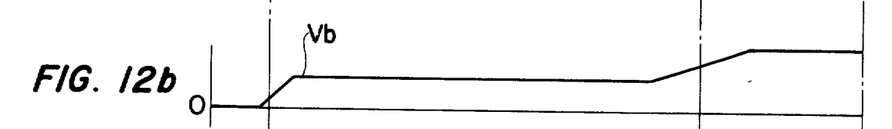
Figure 12C:
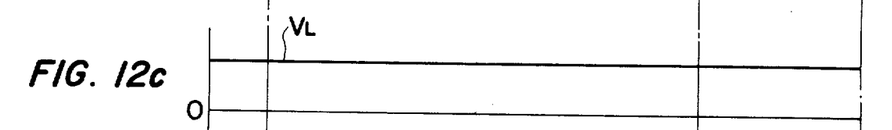
Figure 12D:
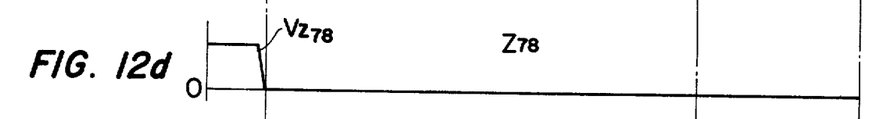
Figure 12E:
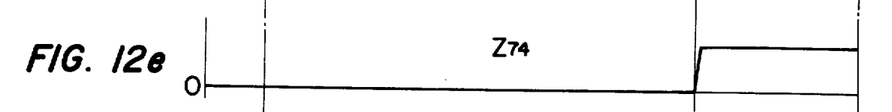
Figure 12F:
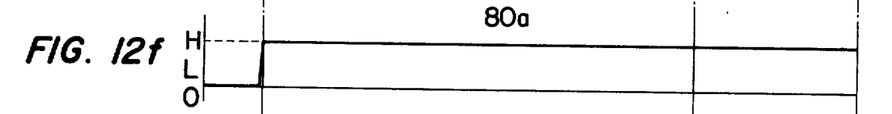

The three potentials in FIG. 12a, FIG. 12b, and FIG. 12c are input potentials to the circuit of FIG. 4. The potential in FIG. 12a is the VD signal at the anode lead of the diode 70 of the circuit of FIG. 4; the potential in FIG. 12b is the brake controlling signal or potential; the potential in FIG. 12c is the potential VL at the output 53C of the OP amplifier 53 of FIG. 3. During time from O to P, the potential VD is above potential Vb so that VZ78 potential is exhibited as a wave potential in FIG. 12d, which is almost zero during the period from P to R, in that potential VD is lower than Vb. The potential at a junction Z78 is inverted by passing through the subsequent inverter 79, at its output of which appears a wave potential in FIG. 12f. The output potential in FIG. 12f is fed one of the inputs of the subsequent NAND circuit 80.

The other amplifier 61 is supplied input signal VL from the circuit 18 through a resistor R60 to its inverting input 61a while to its non-inverting input the brake controlling signal Vb is supplied. The output potential V61 at the output 61C of the OP amplifier 61 is obtained by the following equation $$V61 = \frac{R'o}{R'1}(Vb - VL)$$

where,
R60 = R63 = R'i,
and
R62 = R64 = R'o

Figure 12G:
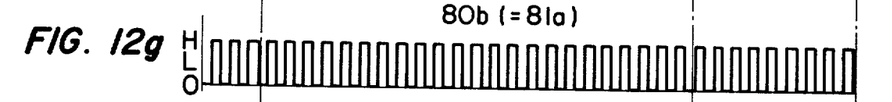
Figure 12H:
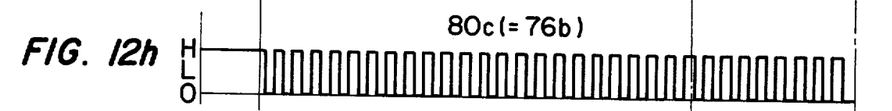
Figure 12I:
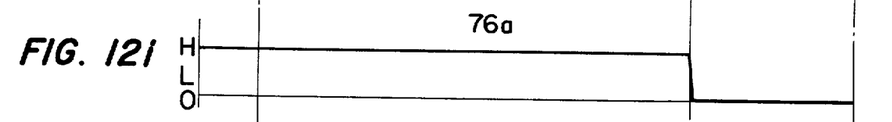

Choice of R'o/R'i at a large value permits the OP amplifier 61 to serve as a comparator. The output potential V61 is fed through a resistor R73 to the next inverter 75 being subjected to an action of a diode VZ74. The output V61 is in turn fed to one input of the subsequent NAND circuit 76. The potential appearing at a junction Z74 is shown by the wave in FIG. 12e. The potential appearing at the junction Z74 is in turn fed to the subsequent inverter 75 the output potential wave of which is shown in FIG. 12i. An astable multivibrator 81 supplies output potential to one input 80b of the NAND circuit 80, as shown in FIG. 12g. On the basis of input 80a(12f), 80b(12g) the NAND circuit 80 supplies an output potential wave shown in FIG. 12h. The subsequent NAND circuit 76 produces an output potential wave shown in FIG. 12j on the basis of the inputs shown in FIGS. 12h and 12i.

It will be helpful if summarize the operation of the circuit 59 in FIG. 4. During the period from time O to time P, the following inequality will be seen in FIGS. 12a-c.

$$VL > VD > Vb$$

Figure 12J:
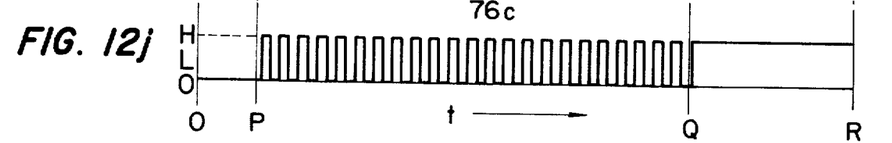

From the above inequality it will be noted that no brake controlling potential appears during the period from time 0 to time P as shown in FIG. 12b. As a result, the NAND circuit 76 supplies no potential as shown in FIG. 12j to the base of the NPN transistor 83 to hold thereof unconducted. A buzzer 23 accordingly is not driven.

During the period from time P to time Q, we have the following inequality.

$$VL > Vb > VD$$

During that period, the output potential 76C is exhibited to produce a wave shown in FIG. 12j. It will be noted that, during this period, the potential wave supplied by the astable multivibrator 81 is translated into exactly the output 76C of the transistor 76. The buzzer 23 is accordingly driven to utter a series of short multiple sounds.

During the period from time Q to time R, the output potential 76C of the transistor 76 continues high potential as shown in FIG. 12j so that the buzzer utters a continuing long sound.

Generally speaking, in case of $Vb < VL$, the buzzer intermittently utters whereas the buzzer continuously utters in case of $Vb > VL$. The driver may be aware of condition under which $Vb > VL$ inequality is established or condition under which $Vb < VL$ inequality is established. It should be noted that, in case of inequality $Vb > VL$, the braking force is limited to a lower rate of braking force to prevent excessive or improper braking force from a safety view point in travelling. As will be seen in FIG. 10, the braking force or brake controlling signal $Vb$ is limited to the reference potential or limiting value when the actual brake controlling signal $Vb$ is in excess of the reference potential VL, as for example, in FIG. 10, when the vehicle speed exceeds 70 km per hour the brake controlling potential is limited to the limiting value VL. In view of the fact that the braking force is insufficient when the vehicle speed exceeds the limiting rate 70 km per hour, the driver is obliged to take any suitable way in continuing the travelling. The aforementioned alarm device is effective for that purpose from a safety view point.

Figure 5:
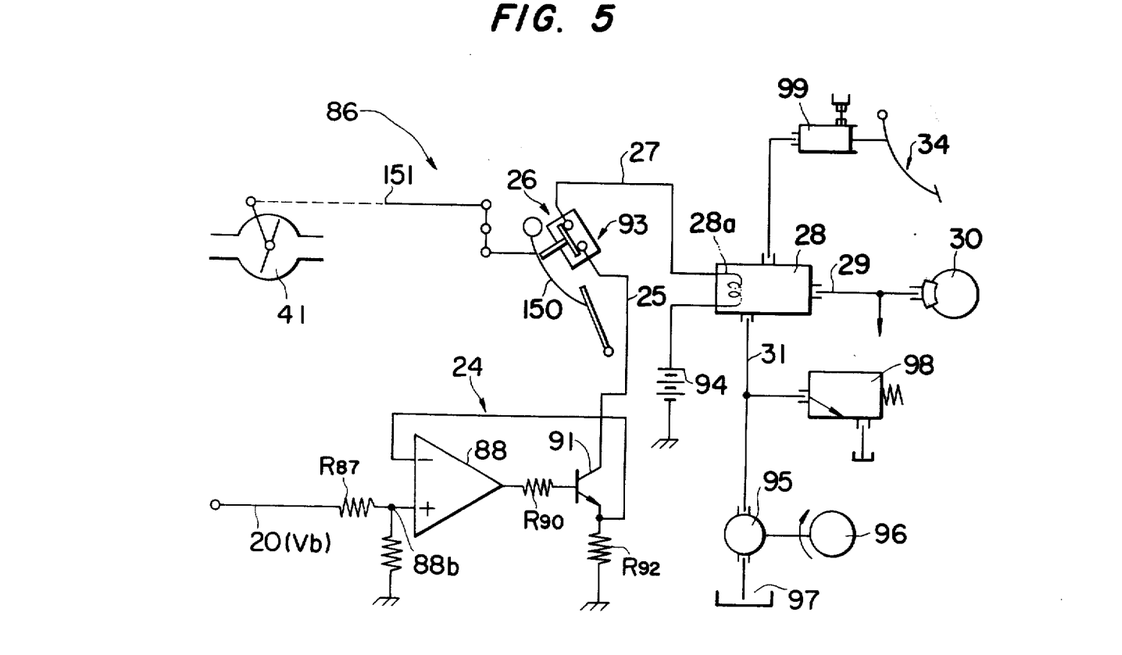
FIGS. 5 and 6 are partial schematics which embody the invention for equipping an automotive vehicle.

In FIG. 5, the circuit enclosed by the dash line 86 in FIG. 1 is shown. The brake control signal $Vb$ at the output 20 is supplied to the input 88b of a OP amplifier 88 of the voltage-ampere converter 24 through resistor 87. The output of the OP amplifier 88 is applied through a resistor R90 to the base of the NPN transister 91 and causes the transistor 91 to conduct. A potential appearing at a point between the emitter terminal of the transistor 91 and the resistor R92 is in feed-back relation connected to the inverting terminal of the transistor 91. As described in the foregoing, the OP amplifier 88 and the transistor 91 form the voltage-current converter and current flow through the transistor is proportional to the brake controlling signal $Vb$. As will be seen in FIG. 5, the acceleration pedal mechanism 150 is operatively connected to the switch 93 in a manner such that, in case of release of acceleration pedal 150, the switch is normally closed to thereby connect an electric power supply source 94 through the switch 93 to the collector terminal of the transistor 91, as shown in FIG. 5. It will be understand that when the throttle valve 41 is active, the brake control potential $Vb$ should be isolated from the brake actuating mechanism. When the transistor 91 conducts, the brake control valve 28 becomes active with coil 28a energized by the current flow through the circuit fromed of the transistor 91, switch 26, coil 28a and the source 94.

The valve 28 is interposed between the brake master cylinder 99 and a pump 95 which is driven by the vehicle engine 96. The reference character 97 indicates a reservoir for the fluid for actuating the known fluid pressure braking system comprising a wheel brake 30. The numeral 98 indicates a relief valve connected to the fluid circuit as indicated by the solid line in FIG. 5.

In operation of the device of FIG. 5, the brake pedal 34 is depressed by the driver as usual in actuating the brake 30. The fluid pressure is applied to the brake 30 through the valve 28 as is usual in operating the ordinary manual fluid pressure braking system. In case of conducting of the transistor 91 when the pedal 34 is being depressed, the valve 28 operates so as to supply supplemental fluid pressure to the brake 30. The specific structure of the valve 28 does not form the invention and may be of the known conventional one so that further description respecting to the valve 28 will not be required. It should be noted that the supplemental fluid pressure supplying by the valve 28 is exactly proportional to the rate of energization of the coil 28a and the energization is in turn proportional to the rate of corrent flow through the transistor 91. Further, the current flow through the transistor 91 is proportional to the input signal potential $Vb$ at the non-inverting terminal of the OP amplifier 88.

From the preceding, it will be apparent that a braking force determined on the basis of the various input data is applied to the brake 30 as will be further explained as the discussion proceeds. In other words, the braking force applied to the brake 30 is proportional to the brake control signal $Vb$.

It should be noted that braking fluid pressure is solely applied to the brake 30 by the above mentioned device, even though no manual braking operation is performed by depressing the pedal.

Figure 6:
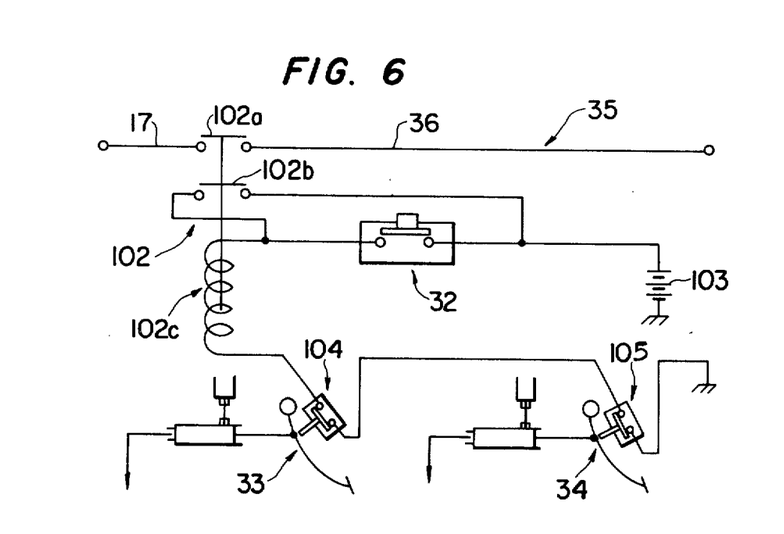

Referring to FIG. 6, the set and reset circuit 35 shown in FIG. 1 will be described in detail. An electric source 103, resume switch 32, coil 102C, switch 104 and switch 105 form a major portion of the set and reset circuit 35. Two terminals 102a and 102b of a relay switch 102 are in integral and together operatively connected to the known plunger of the relay switch. When the relay coil 102C is energized, the switch 102 is closed as shown in FIG. 6. As for the switch 32, the ordinary push button type switch is preferred. Once the switch is closed by manually pushing the button, the relay coil 102 is energized to close the switch 102b as shown and switch 102b provides means to hold the switch in closed position until either switch 104 or 105 is opened. It should be noted that the switch 105 is operatively connected to the brake pedal while the switch 104 is connected to the acceleration pedal.

From the preceding, it will be noted that when the button type switch 32 is pushed by the driver, the relay coil 102C is energized and the input 17 and output 36 are electrically connected through the relay switch 102a so that the acceleration control signal Va may be fed through the circuit 35 to the subsequent speed controlling circuit 39 (FIG. 1).

Figure 7:
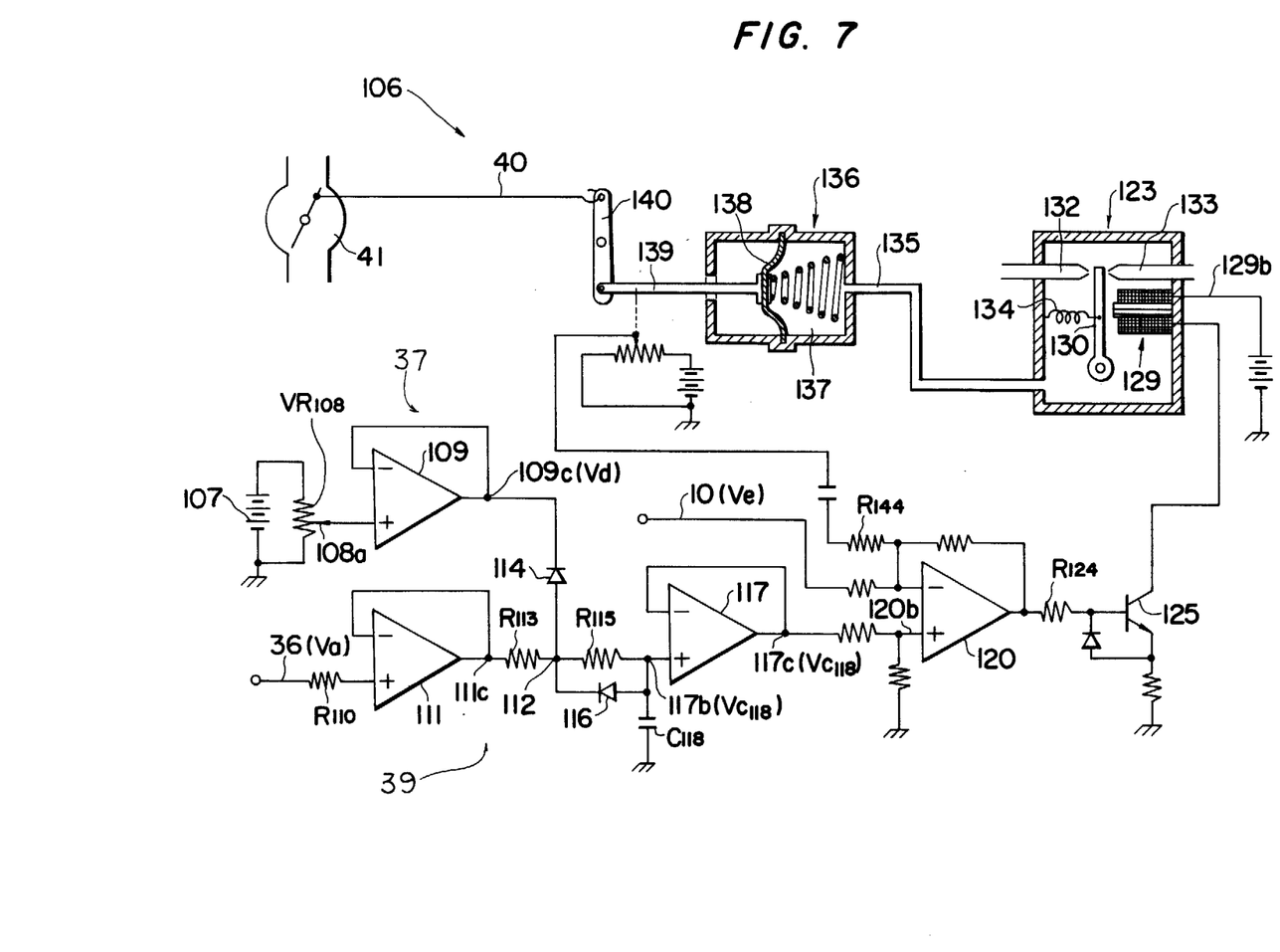
FIG. 7 is a partial schematic which embodies the invention for equipping an automotive vehicle.
Figure 13A:
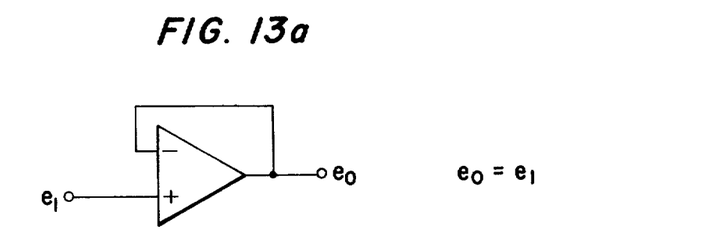
FIGS. 13a to 13c are partial schematics upon which is based the circuit of FIG. 7.
Figure 13B:
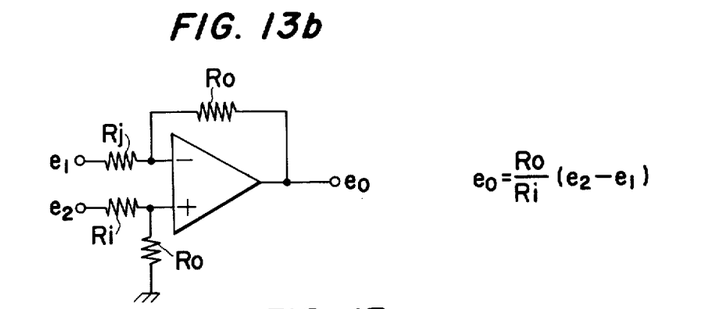
Figure 13C:
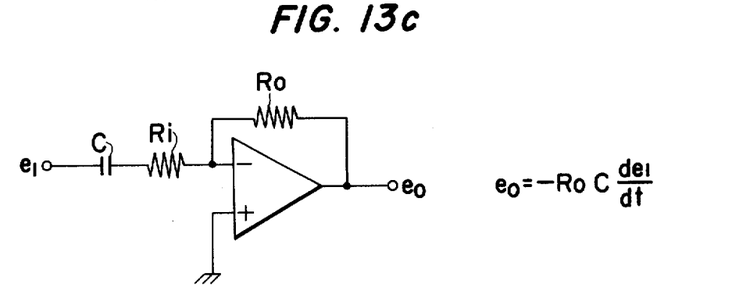

Referring to FIG. 7, the speed controlling circuit 39 is indicated in FIG. 1 by the enclosing dash line 106 together with an associating memory circuit or limiting circuit 37. The limiting circuit 37 has recorded therein an information corresponding to a calibrated or reference speed of the vehicle. FIGS. 13a–c illustrates the conventional known circuit which is employed in the circuit 37. The speed control or limit, that is, memory circuit 37 of FIG. 7 has an OP amplifier 109 to the non-inverting terminal 108a of which is supplied a potential which may be variable by manually operating a resistor VR108. The output potential Vd at the output 109C is of identical rate with that of input potential at non-inverting terminal 108a as will be understand from the illustration of FIGS. 13a–c. The acceleration controlling potential Va is applied to the non-inverting input terminal of the other OP amplifier 111 from the output 36 of the circuit 35 (FIG. 1), and the same action is performed as the preceding by the amplifier 111, so that potential Va appears at the output terminal 111C of the OP amplifier 111.

During the time the potential Vd is above the potential Va, the diode 114 interrupts current flow and the output potential appearing at the output terminal 111C is applied through a resistor R113 and in turn a resistor 115 to the capacitor C118 to charge. The resistors 113 and 115 and the capacitor C118 form a delay-action device the time constant of which is (R113 + R115)·C118. Proper choice of the resistor R115 at a higher value than the resistor R113, the above time constant (R115 + R113)· C118 may be nearly identical with R115 · C118 where the potential Va is higher than potential VC118 appearing at one plate of the charged capacitor C118. In other words, in charging the capacitor C118, the time constant is R115·C118. In case of a higher potential at the one plate than potential Va, the capacitor C118 is permitted to decay through the diode 116 and resistor R113, the time constant of which circuit is R113·C118. Since resistor R115 is of higher rate of resistance than resistor R113, the time constant R115·C118 is larger than the time constant R113·C118. As a result, the capacitor C118 is slowly charged but decays rapidly.

The subsequent OP amplifier 117 is supplied at its non-inverting terminal 117a the above varying output potential Vc118. It should be noted that the precedingly described operation is one performed in case where the acceleration controlling potential Va is lower than the calibrated potential Vd. If the Va potential is higher than that of Vd, the diode 114 permits the current to flow toward output 109C. The potential at the output 111C decays through the resistor R113 and diode 114. The potential at the cathode of the diode 114 is Vd potential so that potential at the junction 112 is nearly identical with Vd potential. It will be understand that the output potential at output 111C of the OP amplifier 111 is subjected to the action of the diode 114 so that the input potential Va is limited to the potential Vd.

Figure 14:
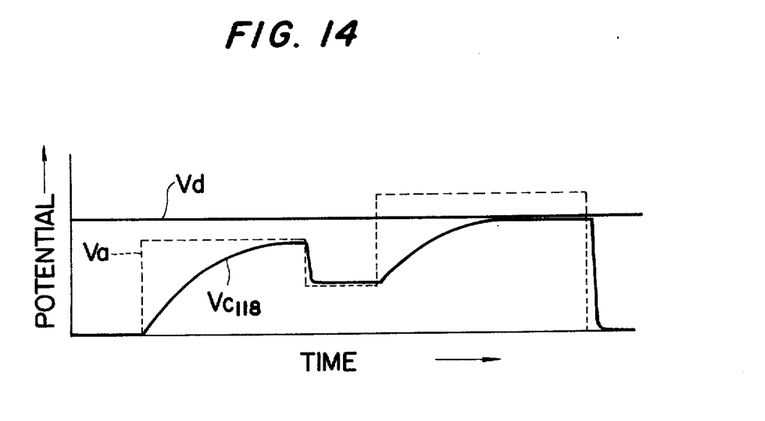
FIG. 14 is a graphical illustration of the performance of the circuit in accordance with the showing of FIG. 7.

The preceding is shown in graphical form in FIG. 14. In FIG. 14, the dash line represents the input potential Va at the input terminal 36 of the OP amplifier 111. The dash line potential Va partially coincides with the VC118 potential curve and is limited to the horizontal line of potential Vd. The Vd potential is, as previously described, given a predetermined calibrated value by operating the resistor VR108 by the driver. From the illustration of FIG. 14, it will be seen that, in case of increase of Va potential the potential Vc118 is slowly increases with the large time constant whereas in case of decrease of Va potential, the potential Vc118 is rapidly decreased. It will be noted that acceleration of the vehicle is effected slowly but deceleration is rapidly effected. This is found advantageous from a safety view point. Further, an excessive sudden acceleration is prevented by limiting the potential Va to the predetermined calibrated value Vd.

The output potential VC118 as above described is applied to the non-inverting input terminal 117b of the OP amplifier 117. The output potential at the output terminal 117C is identical with the VC118 potential and is applied to the subsequent OP amplifier 120 at its non-inverting input terminal 120b. The OP amplifier 120 serves as a differential amplifier circuit. The operation of the differential amplifier circuit is obtained by combining the known conventional circuits illustrated in FIGS. 13b and 13c. To the inverting input terminal of the OP amplifier 120 is supplied the signal Ve corresponding to the actual speed of the equipped vehicle together with a signal supplied from the throttle actuating mechanism 139 through a resistor R144 and representing actuating speed of the mechanism 139. The signal from the mechanism 139 serves as a signal to prevent the device from its hunting in operation. From the showing in FIG. 13c, it will be noted that the signal is proportional to the actuation speed. From the schematic and formula in FIG. 13b, it will be understand that difference between potential Ve and Vc118 is amplified and additionally modified by such feed-backed potential supplied through resistor R144.

In case of lower potential Ve than potential Vc118, the output of the OP amplifier 120 is found to be negative from the formula shown in FIG. 12b, whereas in case of higher value of potential Vc118 than potential Ve, the output of the OP amplifier 120 is positive. The output of the OP amplifier 120 is fed through resistor R124 to the base of the subsequent transistor 125. The transistor 125 is of NPN character and conducts when the base potential is positive while non-conducts in case of negative potential at the base.

From the preceding, it will be understand that when potential Ve is lower than potential Vc118, the transistor conducts and current flows therethrough in proportion to the value of the potential at the base. The current causes the coil 129 to energize. The inequality Ve < Vc118 represents superiority of acceleration control signal Va over the signal Ve corresponding to the actual speed of the vehicle. In other words, such signal Ve is one to cause the vehicle to further accelerate.

When the coil 129 is energized, a flapper 130 of the valve mechanism 128 is moved to the right against a spring 134 until the spring force and magnetic force of the coil balance. A nozzle 132 leads to the known vacuum source of the vehicle and another nozzle 133 leads to the atmospheric pressure. When the flapper 130 is moved to the right or left from its neutral position. the fluid pressure within the valve device 128 varies to thereby vary fluid pressure within the chamber 137 to drive a diaphragm 138 of the actuator 136 to the right or left. The movement of the diaphragm 138 is in turn transmitted through the lever 140 and a rod 40 shown imaginarily in solid line to the throttle valve 41. Acceleration or deceleration is thus achieved by such movement of the diaphragm 138.

In the above described operation of the system, the current flow through the transistor 125 is proportional to the potential at its base and the energization of the coil 129 is in turn proportional to the current. Further, the movement of the flapper 130 is proportional to the magnetic force of the coil 129. The throttle valve 41 operates in the same manner in proportion to the current flow through the transistor 125. In other words, the throttle valve is operated in proportion to the signal Va. In such operation of the throttle valve 41, means should be provided for keeping the acceleration pedal 150 in the state under no affection by such operation. A chain or any other flexible means 151 is preferred to connect the throttle valve 41 and the pedal 150.

What is claimed is:

1. An anti-crash radio detector system for automotive vehicle, which comprises a radio-electric or radar detector projecting ahead of the vehicle a radio electric wave beam and receiving the echoes reflected by fixed or movable obstacles appearing in front of the vehicle and further producing from informations on said echoes another information relating to velocity of approach of the vehicle equipped with this detector in relation to a fixed or movable obstacle and still another information relating to a distance between said obstacle and the vehicle, means for producing an information representing an actual speed of the vehicle, an electric computer for determining on the basis of said three informations a brake controlling signal and an acceleration controlling signal, means for automatically actuating the brake system upon receiving said brake controlling signal, means for automatically actuating the throttle valve mechanism upon receiving said acceleration controlling signal, and means operatively connected to the steering wheel mechanism and the turning direction indicating mechanism for blocking communication between said computer and both of said brake system and said throttle valve mechanism when the steering wheel or the turning direction indicating mechanism is manually operated.

2. An anti-crash radio-detector system as set forth in claim 1, wherein the system further comprises means for producing a reference rate of braking on the basis of said brake controlling signal and said information representing said actual speed of the vehicle for limiting the braking when said brake controlling signal is above said reference rate to thereby avoid excessive braking.

3. An anti-crash radio-detector system as set forth in claim 2, wherein the system further comprises means for producing on the basis of the brake controlling signal and the reference rate a series of multiple short alarming sounds or a long continuous alarming sound to thereby warn the driver of the brake controlling being performed.

4. An anti-crash radio-detector system as set forth in claim 1, wherein the system further comprises means for producing a reference rate of acceleration controlling on the basis of said acceleration controlling signal and said information representing said actual speed of the vehicle, limiting said acceleration controlling signal to said reference rate, and delaying said acceleration controlling action in case of increase of travelling speed of the vehicle while permitting rapid action to decrease the travelling speed of the vehicle.

* * * * *